United States Patent

[11] 3,576,474

[72] Inventors Frank X. Huber; Samuel E. Miller, Kokomo; James E. Reynolds, Sharpsville; Albert D. Rittmann, Kokomo, Ind.

[21] Appl. No. 707,831
[22] Filed Feb. 23, 1968
[45] Patented Apr. 27, 1971
[73] Assignee General Motors Corporation Detroit, Mich.

[54] PASSIVATED POWER RECTIFIER
1 Claim, 1 Drawing Fig.

[52] U.S. Cl. ........ 317/234
[51] Int. Cl. ........ H011 1/10
[50] Field of Search ........ 317/234 (1, 2, 3, 4.1, 11, 7)

[56] References Cited

UNITED STATES PATENTS 3,176,382 4/1965 Dickson et al. ........ 367/234

FOREIGN PATENTS 271,201 7/1965 Australia ........ 317/234(3)
873,916 7/1958 Great Britain ........ 317/234(4)

*Primary Examiner*—Jerry D. Craig
*Attorneys*—R. J. Wallace and William G. Pettigrew

ABSTRACT: An improved hermetically sealed semiconductor device and the method of making that device. The improvement inhibits deterioration of the electrical characteristics of hermetically sealed semiconductor devices having a getter body included within the sealed housing for environmental control therein, along with the semiconductive body. A small quantity of insulating liquid is added to the housing sufficient to cover the surface of the semiconductive body but insufficient to cover an effective area of the getter body.

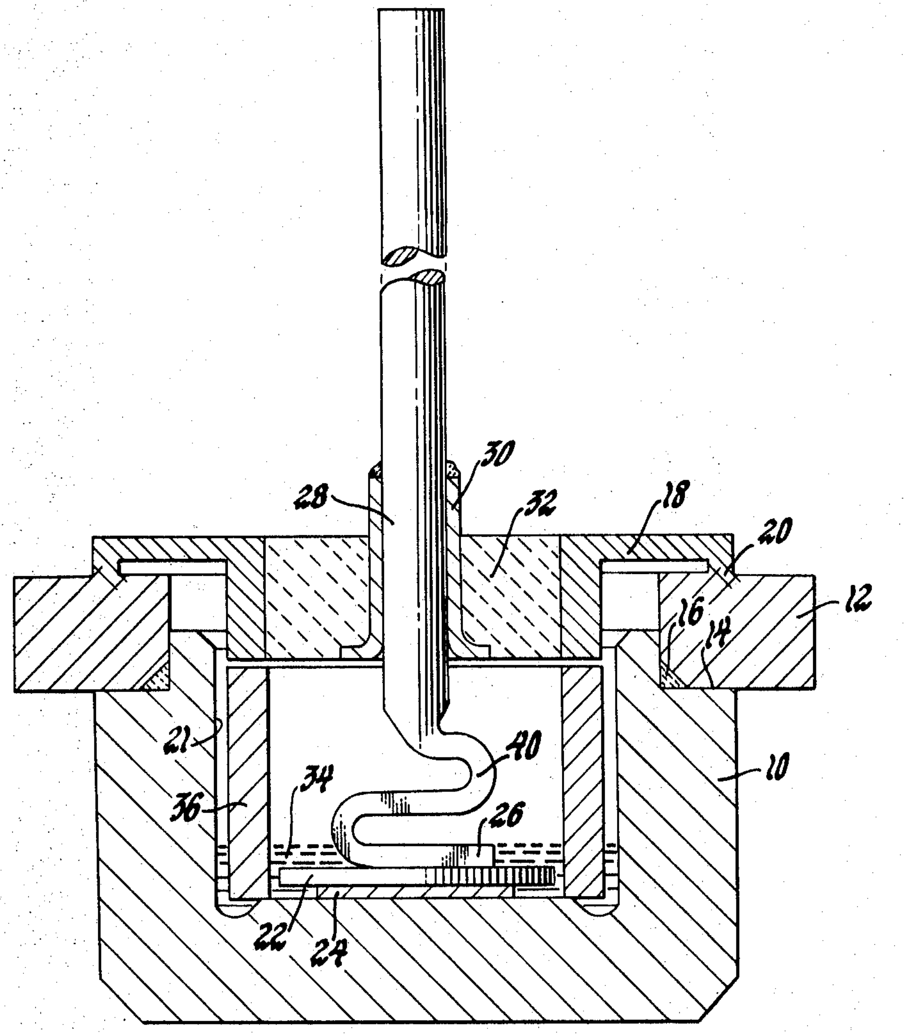
INVENTORS.
Frank X. Huber,
Samuel E. Miller,
James E. Reynolds &
BY Albert D. Rittmann
R. J. Wallace
ATTORNEY

PASSIVATED POWER RECTIFIER

CROSS REFERENCES

U.S. Pat. No. 3,299,303, E. J. Newill et al.

BACKGROUND OF THE INVENTION

It has been the practice to protect a rectifying junction in a semiconductive body of a semiconductor device by providing a selected protective environment for the junction. In some instances the protective environment is provided as a silicon dioxide coating on the surface of the semiconductive body over the junction. In other instances, the semiconductive body is protected by enclosing it within a housing which provides the protective environment. The housings of some devices are substantially completely filled with a liquid to facilitate removal of heat from the semiconductive body to the enclosing housing, particularly if the semiconductive body is mounted on a terminal post within the housing. In such devices no special atmosphere control within the housing is needed.

However, in higher power devices it is preferred to mount the semiconductive body directly on the inner surface (e.g. the base) of the housing to obtain maximum heat transfer, for maximum power ratings. In these latter devices no heat transfer liquid is therefore needed or used. Such devices are normally hermetically sealed in a dry air atmosphere. In many instances a solid body of a getter, an atmosphere purifier, is also included within the housing to insure that the atmosphere within the sealed enclosure is pure. Inclusion of a getter body within the hermetically sealed housing is particularly desirable if the housing is sealed by hot welding. Hot welding can generate detrimental gases within the housing. These gases, and any water vapor trapped in the enclosure, can be effectively removed by the getter sealed within the enclosure. Hence, it has been the practice to provide the protective environment in hermetically sealed power devices by simply placing a getter body within the device housing before it was sealed. This protective environment was considered satisfactory to inhibit degradation in electrical properties of the semiconductive body.

On the other hand, we have found that the effective life of such a device is actually more limited than previously believed, particularly under conditions of vibration and reverse bias. Automotive diodes, for example, are subjected to such conditions. We have found that degradation eventually can occur even though the housing atmosphere remains pure and there is no visible deterioration of the semiconductive body assembly within the housing. Thus, even though the device is apparently completely protected, it nevertheless can eventually degrade. We have not only recognized this problem but have found a simple and economical means for inhibiting this degradation.

SUMMARY OF THE INVENTION

Accordingly, it is a principal object of the invention to provide a means for extending the effective life of a hermetically sealed semiconductor device, particularly a hot welded power device.

Additional objects of the invention are to provide an improved semiconductor device, and to provide a simple and economical method for producing such a device, which method is especially amenable to commercial production use.

These and other objects of the invention are accomplished by adding a small quantity of an insulating liquid, such as a silicone oil, to the housing of a hermetically sealed and gettered semiconductor device before the housing is sealed. The quantity of liquid added is sufficient to cover the surface of the semiconductor body enclosed within the housing. However, the quantity is less than that which will cover an effective area of the getter body included within the housing.

BRIEF DESCRIPTION OF THE DRAWING

Other objects, features and advantages of the invention will become more apparent from the following description of preferred examples thereof and from the drawing which shows a sectional view of a silicon rectifier produced in accordance with the invention.

DESCRIPTION OF THE PREFERRED EMBODIMENTS

The drawing shows a silicon rectifier of the type used in an automotive alternator assembly such as described in U.S. Pat. No. 3,299,303, E. J. Newill et al., which is incorporated herein by reference. The rectifier is a hermetically sealed, hot welded device having a copper housing cup 10 with a steel weld ring 12 brazed at its lip 14. Brazing material 16 accumulates in a chamfered area of the weld ring 12. A steel cover element 18 is welded at 20 to the upper edge of the weld ring 12, forming a hermetically sealed enclosure 21 for a semiconductor body 22 therewithin. The semiconductor body is a silicon wafer having a PN junction region parallel its major surfaces. Thus, its opposite major surfaces are of P and N types, respectively.

The lower surface of the semiconductor body 22 is soldered to a molybdenum or tungsten contact element 24 which is, in turn, soldered to the bottom of the enclosure 21. An electrode 26 is soldered to the upper surface of the semiconductor body 22. An integral terminal portion 28 extends from electrode 26 out through the cover 18. The terminal portion 28 is centrally disposed within cover element 18 and is imperforately bonded as by soldering to a metal ferrule 30 which is, in turn, embedded within an enclosing annular glass region 32 which serves to insulate terminal portion 28 from the balance of the cover 18 and the contacting housing cup 10.

A small quantity of a silicone oil 34 is shown covering the surface of semiconductor body 22. The level of the silicone oil 34, however, is insufficient to cover an effective area of tubular molecular sieve getter element 36 which rests on the bottom of enclosure 21 with its axis perpendicular thereto and coaxial with terminal portion 28. It can also be seen that molecular sieve 36 surrounds and substantially encloses the semiconductor and electrode assembly. Molecular sieve element 36 is a getter and locator. As a getter, it purifies the atmosphere within the enclosure by absorbing undesirable gases trapped or generated within the enclosure when the cover 18 is welded on. It also helps shield against welding flash. As a locator, it aids in assembling the various parts comprising the semiconductor-electrode assembly including solder preforms, during manufacture. As is customary when using a getter, the molecular sieve element 36 is not fastened in any way within the housing and is, therefore, free to move both axially and radially within the housing to engage both the end walls and sidewalls of the housing, as is customary.

In making the device shown in the drawing, the weld ring 12 is first brazed to the housing cup 10 to form a unit within which the semiconductor device can be assembled. The tubular molecular sieve element 36 is then placed within the cup, after the weld ring has been attached. The tubular element 36 is positioned with its axis perpendicular to the bottom of the cup, defining a central region of the cup bottom within the enclosure.

A solder preform is then placed in the cup within the area enclosed by tubular element 36, followed by molybdenum electrode element 24, another solder preform, silicon body 22, still another solder preform, and electrode element 26. If electrode 26 is precoated with solder, the last-mentioned solder preform can obviously be omitted. The cover 18 is then placed over terminal portion 28 and a solder ring placed on the terminal portion extending above the cover. The entire assembly is then heated to an appropriate soldering temperature in a nonoxidizing atmosphere. It is then cooled and the cover element 18 is lifted sufficiently to introduce the end of a hypodermic needle within enclosure 21, preferably within the interior of tubular element 36. The S-bend 40 between electrode 26 and terminal portion 28 permits the cover to be lifted without adversely affecting the soldered assembly. A few drops of a silicone oil are then injected within the enclosure, preferably using a hypodermic syringe, sufficient to cover the surface of semiconductor body 26 but insufficient to cover an effective area of a getter body 36. No particular care must be exhibited to prevent the oil from contacting the upper regions of getter body 36. However, it is preferred to exercise such care if the axial extension of the tubular getter body 36 is not appreciable or if the nonimmersed surface area will be significantly reduced thereby. Other insulating liquids or more viscous materials such as silicone grease could also be used. Other getters which can be used would include thirsty vycor, activated aluminum oxide, activated carbon, silica gel, barium oxide, etc. We prefer to use the molecular sieve, a commercial zeolite. Thirsty vycor is another particularly effective getter. It is a porous glass analogous to a molecular sieve in that it is used as a hard, coherent, vitreous body, which are characteristics which appear to accelerate degradation under concurrent vibration and reverse bias conditions.

After the silicone oil is introduced within the enclosure 10, cover 18 is resistance welded in the usual manner to weld ring 12 to form a hermetically sealed semiconductor device. It is preferred to warm the assembly somewhat to enhance the effectiveness of the getter before sealing. Other known treatments may also be used before sealing, if desired, to enhance the effectiveness of the getter, depending on the getter used, so long as these treatments do not alter the predetermined characteristics of the semiconductor body. Any detrimental gases generated during welding are adsorbed by the getter body 36, as well as any moisture which may have been entrapped within the enclosure when it was sealed. The improved device is then ready for use.

It is to be understood that although this invention has been described in connection with certain specific examples thereof, no limitation is intended thereby except as defined in the appended claims.

We claim:

1. A passivated power rectifier comprising a hermetically sealed housing, one face of a rectifier wafer bonded to an end wall of said housing, said rectifier wafer having a PN junction exposed on the edges thereof, an electrode bonded to the opposite face of said wafer with a terminal lead extending therefrom through an opposite end wall of said housing, a tubular body of a molecular sieve within said housing generally coaxial with said terminal lead and surrounding said wafer for controlling the atmosphere within said housing, and a quantity of silicone oil partially filling said housing and incompletely immersing said body of molecular sieve.